United States Patent [19]
Mishiro

[11] Patent Number: 4,703,214
[45] Date of Patent: Oct. 27, 1987

[54] ULTRASONIC VIBRATOR AND ITS DRIVE CONTROL METHOD

[75] Inventor: Shoji Mishiro, Kanagawa, Japan

[73] Assignee: Taga Electric Co., Ltd., Tokyo, Japan

[21] Appl. No.: 913,754

[22] Filed: Sep. 30, 1986

[30] Foreign Application Priority Data

Nov. 27, 1985 [JP] Japan .................. 60-266617
Dec. 24, 1985 [JP] Japan .................. 60-291732
Jan. 23, 1986 [JP] Japan .................. 61-12822
Apr. 21, 1986 [JP] Japan .................. 61-91880

[51] Int. Cl.$^4$ .......................... H01L 41/08
[52] U.S. Cl. ..................... 310/328; 310/317; 310/323; 310/325
[58] Field of Search ............ 310/314, 26, 316–319, 310/323, 328, 325; 318/116, 118

[56] References Cited

U.S. PATENT DOCUMENTS

| 4,210,837 | 7/1980 | Vasiliev et al. | 310/323 |
| 4,620,121 | 10/1986 | Mishiro | 310/328 X |
| 4,642,509 | 2/1987 | Kumada | 310/323 |
| 4,652,786 | 3/1987 | Mishiro | 310/328 X |
| 4,663,556 | 5/1987 | Kumada | 310/328 X |

FOREIGN PATENT DOCUMENTS

| 0148385 | 8/1985 | Japan | 310/323 |
| 0623241 | 9/1978 | U.S.S.R. | 310/328 |
| 0794700 | 1/1981 | U.S.S.R. | 310/323 |
| 0803048 | 2/1981 | U.S.S.R. | 310/323 |

Primary Examiner—Mark O. Budd
Attorney, Agent, or Firm—Oblon, Fisher, Spivak, McClelland & Maier

[57] ABSTRACT

In an ultrasonic vibrator, a plurality of electrode pairs, each including electrodes halved on one surface, are arranged in the circumferential direction so as to constitute an electrostrictive element. The electrostrictive element is held and tightened by a vibrator and a metal member. The vibrator is provided with foot portions divided in a number of divisions coincident with the number of the electrode. The halved electrodes of the electrode pairs are connected while parallel in matching with the circumferential position, and AC voltages controlled in relative phase or relative amplitude are applied to respective electrodes. Various vibrations are generated in the vibrator, and the elliptic rate can be controlled during control of the vibration direction or generation of elliptic vibration.

8 Claims, 27 Drawing Figures (a)(b)(c)(d)(e)(f)(g)(h)(i)

(a) (b) (c) (d) (e)

ULTRASONIC VIBRATOR AND ITS DRIVE CONTROL METHOD

FIELD OF THE INVENTION AND RELATED ART STATEMENT

The present invention relates to an ultrasonic vibrator which generates compound vibration in any direction, and more particularly to an ultrasonic vibrator which is suitable for utilization in an ultrasonic motor or the like and to its drive control method.

In general, ultrasonic vibrators which are used widely include that of Langevin type where an electrostrictive element of disk form is held by two metal bodies and resonance is effected as one body, and that of $\pi$ type where ferrite magnetostrictive material is molded in cylindrical form or $\pi$-like form.

From the viewpoint of the vibration direction, there exist a longitudinal vibrator to vibrate in the axial direction and a torsion vibrator to perform torsional vibration in symmetry with respect to the axis. These are single direction vibrators to generate vibration only in a single direction, in the axial direction only or in the torsional direction only.

Construction of an ultrasonic vibrator by such a single direction vibrator is disclosed, for example, in Japanese patent application No. 125052/1980. In this example, a vibrator in the axial direction is used and a vibrating piece is installed at the output end of the vibrator. The normal of contact surface of a movable member such as rotor is slightly inclined with respect to the axial direction of the vibrator so as to press the vibrator against the rotor. As a result, the top end portion of the vibrating piece performs elliptic vibration and drives the rotor in frictional drive. In such an ultrasonic vibrator of vibrating piece type, however, the contact part between the vibrating piece and the rotor may be abraded significantly, and noise generation is large.

On the other hand, FIG. 27 shows a system different from the above-mentioned ultrasonic motor. In this system, a longitudinal vibrator 1 is installed and a torsion converter 2 is tightened to the longitudinal vibrator 1 integrally, thereby a vibrator 3 is formed. The torsion converter 2 is provided on one surface with a wide groove 4, and no other surface with a beam-like projection 5 forming an angle with respect to the groove 4. A rotor 8 is mounted on the torsion converter 5 in a pressed state through a bolt 6 and a coil spring 7. If longitudinal vibration generated by the longitudinal vibrator 1 is applied to the torsion converter 2, elliptic vibration in the thick arrow direction is generated at top end portion of the beam-like projection 5 of the torsion converter 2 and the rotor 8 contacting with the projection 5 is rotated clockwise. Thus an efficient ultrasonic motor is constituted.

According to such means, however, the elliptic rate of the elliptic vibration as a vibration mode at the output end cannot be controlled. Because the elliptic rate is determined entirely by the form of the torsion converter 2. Consequently, abrasion at the frictional surface between the rotor 8 and the beam-like projection 5 cannot be decreased or the drive at the maximum torque cannot be performed sufficiently by controlling the elliptic rate to optimum value for the friction drive. Moreover, the rotational direction of the rotor 8 cannot be controlled. The rotational direction of the rotor 8 is also determined uniformly by the form of the torsion converter 2.

OBJECT AND SUMMARY OF THE INVENTION

A first object of the invention is to provide an ultrasonic vibrator and its drive control method wherein elliptic rate of elliptic vibration at the output end and the vibration direction of the output end can be controlled and compound vibration can be controlled.

A second object of the invention is to provide an ultrasonic vibrator and its drive control method wherein drive torque to a driven substance can be made large in the case of application to an ultrasonic motor for example.

A third object of the invention is to provide an ultrasonic vibrator and its drive control method wherein vibration distribution of an output end portion having large diameter to generate a large drive force can be made uniform.

A fourth object of the invention is to provide an ultrasonic vibrator and its drive control method wherein the resonance property is excellent.

In the invention to attain the above objects, an electrostrictive element comprises a plurality of electrode pairs arranged in circumferential direction, and each electrode pair is composed of electrodes halved in a pair in the circumferential direction and formed on one surface of the electrostrictive element body polarized in the thickness direction, and a common electrode is formed on the other surface thereof. A vibrator is divided in the circumferential direction by a dividing number coincident to the number of the electrode pairs to form fast portions, and the electrostrictive element is positioned between the vibrator and an metal member and held and tightened integrally.

Circumferentially matching electrode halves of the electrode pairs are connected in series to form two parallel circuits. AC voltages are applied to the parallel circuits and the mutual phase differences, the mutual amplitude differences, or both, of the AC voltages applied to the two circuits is varied. One of the AC voltages may be inverted as compared to the other. One can thereby provide linear vibration, circular vibration or elliptical vibration in any direction on the surface of the vibrator, and the elliptical rate in the elliptical vibration can be controlled.

DESCRIPTION OF PREFERRED EMBODIMENTS

Figure 1:
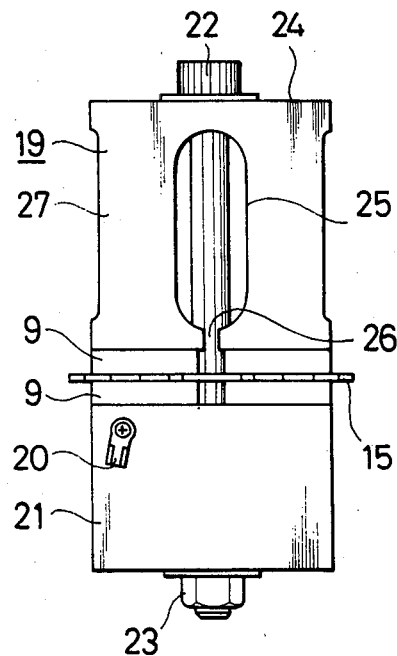
FIG. 1 is a sectional view illustrating a first embodiment of the invention.
Figure 2:
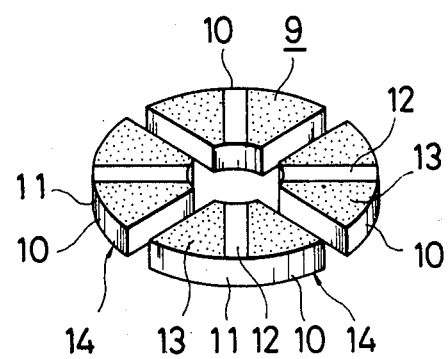
FIG. 2 is a perspective view of an electrostrictive element.

A first embodiment of the invention will be described referring to FIGS. 1 through 11. An electrostrictive element 9 shown in FIG. 2 comprises four electrode pairs 10 arranged annularly in the circumferential direction. Each electrode pair 10 is composed of electrodes 13 halved in a pair by an insulation part 12 and formed on one surface of an electrostrictive element body 11, and a common electrode 14 formed on other surface thereof.

Figure 3:
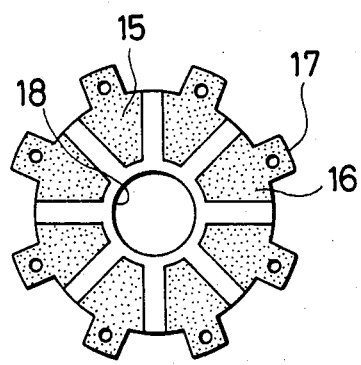
FIG. 3 is a plan view of an electrode.

FIG. 3 shows an electrode plate 15. The electrode plate 15 comprises electrode portions 16 each formed at position corresponding to an electrode 13 of the electrostrictive element 9, and terminals 17 formed on respective electrode portions 16. The electrode plate 15 is a printed circuit board constituted by a glass-epoxy thin plate having a hole 18 at the center and copper foils on both surfaces.

FIG. 1 shows an ultrasonic vibrator. Two electrostrictive elements 9 are contacted respectively with both surfaces of the electrode plate 15. A vibrator (vibrator member) 19 is contacted with one electrostrictive element 9, and a metal member 21 having a common terminal 20 is contacted with other electrostrictive element 9. The electrostrictive element 9, the vibrator 19 and the metal member 21 are held and tightened integrally by means of a bolt 22 passing through the center and having conductivity and a nut 23. Explaining the vibrator 19 in detail, one end surface of the vibrator 19 is an output end portion 24, and a wide groove 25 and a narrow groove 26 are formed towards the other end surface of a vibrator 19. Foot portions of the number coincident to that of the electrode pairs 10 are formed by these grooves 25, 26, and end surfaces of these foot portions 27 are contacted with respective common electrodes 14 of the electrode pairs 10.

Regarding the electrodes 13 of the electrostrictive elements 9, the electrodes 13 of each electrode pair 10 are connected in parallel to form two parallel circuits position serially connecting electrodes 13 at matching circumferential positions, and a drive circuit (not shown) is connected to the terminals 28 and 29 and the common terminal 20.

Figures 4, 5:
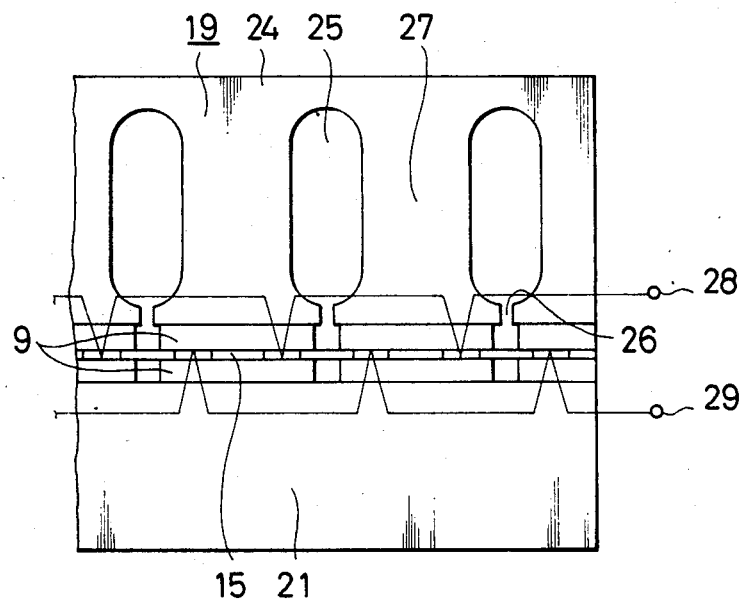
FIG. 4 is a development of FIG. 3.
FIG. 5 is a diagram illustrating a vibration state of the output end portion.

In this construction drive control voltage is applied from the drive circuit to the electrostrictive element 9. FIG. 4 shows development view in the circumferential direction for convenience of the description. In the electrodes 13 of the electrode pair 10, a lead terminal 28 drawn from the right side of each electrode pair 10 and a lead terminal 29 drawn from the left side thereof are installed. A drive source which can control mutual phase is connected between the lead terminals 28, 29 and the common terminal 20, and the drive frequency is adjusted to be coincident to the resonance frequency in the axial direction.

If the phase difference is made zero, the same-phase parallel drive is effected, and vibration on the circumferential surface of the output end 24 becomes the axial resonance vibration as shown in FIG. 5 (e) and the vibration is effected in similar mode to an ordinary longitudinal vibrator. On the contrary, if phase of the drive source applied to the lead terminal 28 is advanced with respect to the lead terminal 29, vibration on the circumferential surface of the output end 24 becomes the counterclockwise elliptical vibration elongated in the longitudinal direction as shown in FIG. 5 (d). As the phase is advanced further, the ellipse form varies to be shorter in the axial direction and longer in the perpendicular direction to the axial direction as shown in FIG. 5 (c) (b) (a). This operation is effected because the vibrator 19 is bent in the axial direction and also in the circumferential direction due to the phase difference of the expansion and contraction between the right half and the left half in the electrode pair 10 of the electrostrictive element 9, and compound vibration is generated by a combination of the axial vibration and the torsional vibration with phase difference of 90°. On the other hand, if the phase of the drive voltage to the lead terminal 28 is delayed with respect to the lead terminal 29, the elliptical vibration is turned clockwise and as the phase difference increases the vibration mode varies as shown in FIG. 5 (f) (g) (h) (i).

Figure 6:
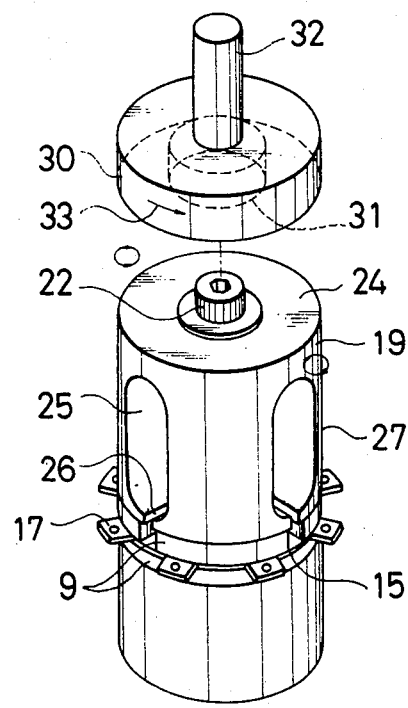
FIG. 6 is an exploded perspective view illustrating the operation principle as a rotary ultrasonic motor.

FIG. 6 shows an example of application of the above-mentioned vibration mode to a rotary ultrasonic motor. In the rotary ultrasonic motor, a disk acting as a rotor is pressed and contacted to an output end portion 24 of a vibrator 19. In the disk 30, a spot facing hole 31 is formed on the center at the side of the contact surface with the output end portion 24, and a shaft 32 is formed at the center of the other surface. For example, if the drive voltage is controlled so that the output end portion 24 performs the vibration shown in FIG. 5 (i), the disk 30 is rotated about the shaft 32 in the direction of arrow 33. If the relative phase is controlled as in FIG. 5 (f) the rotational speed becomes slow, and if the phase difference is zero the vibration is only in the axial direction as shown n FIG. 5 (e), resulting in a stationary state for the rotor. Further, if the phase is increased in the reverse direction, the rotational speed of the disk 30 is increased in the reverse direction to the arrow 33.

FIG. 6 shows the principle only, and mechanical parts such as a bearing or a pressing device are omitted in the figure.

In the above-mentioned rotary ultrasonic motor, one vibrator 19 enables drive in both forward and reverse rotational directions, and control of the elliptic rate becomes possible. Thereby abrasion at the contact surface is minimized and drive at the best contact state becomes possible. Moreover, it is important that since contact on the whole circumferential surface of the output end portion 24 is possible a large drive torque is obtained with a small surface pressure and the efficiency and the reliability can be significantly improved.

Figure 7:
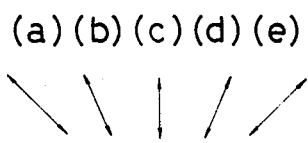
FIG. 7 is a diagram illustrating the vibration state of the output end portion.
Figure 8:
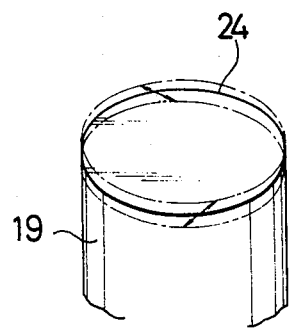
FIG. 8 is a perspective view illustrating the vibration state of the output end portion.

Referring to FIG. 1 and FIG. 4, the phase of the drive sources applied to the lead terminals 28, 29 is made the same and their relative amplitudes are varied. Then the amplitude mode on the circumferential surface of the output end portion 24 becomes a line inclined to the axial direction. That is, if the applied voltages are the same phase and the same amplitude, as shown in FIG. 7 (c), the resonance vibration in the axial direction is performed in similar manner to an ordinary longitudinal vibrator. If the drive voltage of the lead terminal 29 is made lower than that of the lead terminal 28 the line is inclined to the left as shown in FIG. 7 (b), and if the difference is increased the direction is further inclined as shown in FIG. 7 (a). On the contrary, if the difference is reversed the line is inclined in the reverse direction as shown in FIG. 7 (d) (e). Thus the inclination angle can be freely controlled by the relative amplitude of the drive voltage. Vibration of the output end surface 24 in FIG. 7 (e) becomes the resonance vibration in counterclockwise rotation while extending in the axial direction or in clockwise rotation while contracting as shown by the dash-and-dot line and arrow in FIG. 8. Such a vibration mode can be widely utilized in the ultrasonic machining field. For example, it is suitable for drilling machining or tapping machining.

Figure 9:
FIG. 9 is a diagram illustrating the vibration state of the output end portion.

Next, the phase difference of the drive voltage applied to the lead terminals 28, 29 is made 180°. That is, the terminals are driven with phase inversion. Then the output end portion 24 performs torsional resonance vibration. Such vibration is obtained when bending vibration in the axial direction exists at the axial end portion, but a resonance point of higher rank is also generated near the axial resonance frequency. The phase difference of the drive voltage applied to the lead terminals 28, 29 is made 180°, thereby the phase inversion is performed and adjustment to the bending resonance frequency near the axial resonance frequency is performed. Thus the resonance vibration is obtained in linear form in the circumferential direction as shown in FIG. 9 (d). On the contrary, taking the phase difference 180° as reference, advancing or delaying the phase of the applied voltage of the lead terminal 28 with respect to the lead terminal 29 is adjusted. Thereby the elongate elliptic vibration is obtained in the counterclockwise direction as shown in FIG. 9 (c) or in the clockwise direction as shown in FIG. 9 (e). As the phase difference is further increased, the ellipse form varies in FIG. 9 (b) to (a) or in FIG. 9 (f) to (g). Since the above-mentioned torsional resonance vibrator is very low in comparison to the axial resonance frequency, the device can be made smaller if the frequency is made equal.

Figure 10:
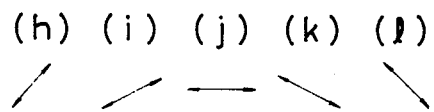
FIG. 10 is a diagram illustrating the vibration state of the output end portion.

If the relative amplitude of the drive voltage in synchronization with the bending resonance frequency is controlled, the linear vibration inclined to the circumferential direction is obtained as shown in FIG. 10 (h)-(l).

As above described, the drive voltage controlled in relative phase or relative amplitude is applied to the electrodes 13 as a pair, or the drive voltage is inverted, thereby various compound vibrations can be obtained.

Although the electrode plate 15 is formed as a print board of glass-epoxy base in the description, the electrode may be formed by means of evaporation, plating, printing or the like onto an insulation substrate such as ceramics in practice.

The electrode of the electrode plate 15 may be formed on one surface, and the whole device may be constituted by one electrostrictive element 9.

Further, the vibrator 19 and the metal member 21 are preferably set to such form that the resonance frequency of these members becomes nearly equal and the vibration amplitude in the axial direction and the bending direction is enlarged.

Figure 11:
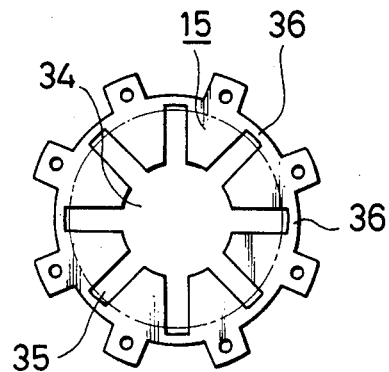
FIG. 11 is a perspective view illustrating a modification of an electrode plate.

FIG. 11 shows a modification of the electrode plate 15. The diameter of the electrode plate 15 is made larger than that of the electrostrictive element 9, and eight grooves 35 are formed radially from a center hole 34. After assembling, connecting portions 36 on outer circumferential portion of the grooves 35 are cut off so as to form the independent electrode.

Figure 12:
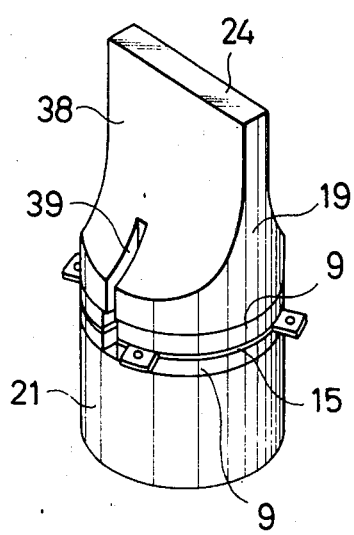
FIG. 12 is a perspective view illustrating a second embodiment of the invention.
Figure 13:
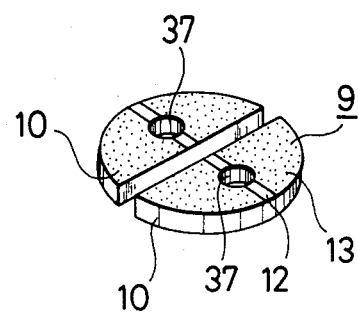
FIG. 13 is a perspective view of an electrostrictive element in FIG. 12.

Next, a second embodiment of the invention is shown in FIGS. 12 and 13. Like parts to the first embodiment are designated by the same reference numerals, and the description thereof shall be omitted. An electrostrictive element 9 comprises two electrode pairs 10 with electrodes 13 halved by an insulation portion 12, and each electrode pair 10 is provided at the center with a hole 37. Two electrostrictive elements 9 are used and an electrode plate 15 is disposed therebetween, and a vibrator 19 is provided with a groove 39 in the axial direction and with an exponential step portion 38.

Figure 14:
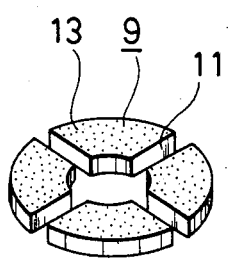
FIG. 14 is a perspective view illustrating a modification of an electrostrictive element.
Figure 15:
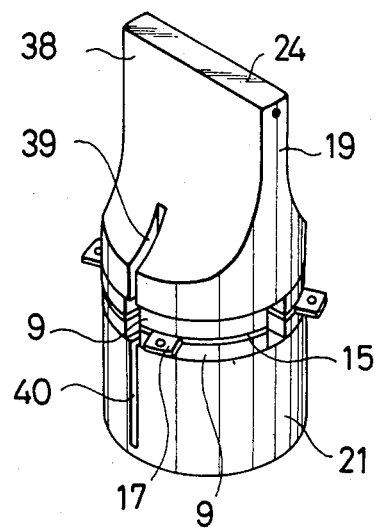
FIG. 15 is a perspective view illustrating a third embodiment of the invention.
Figure 16:
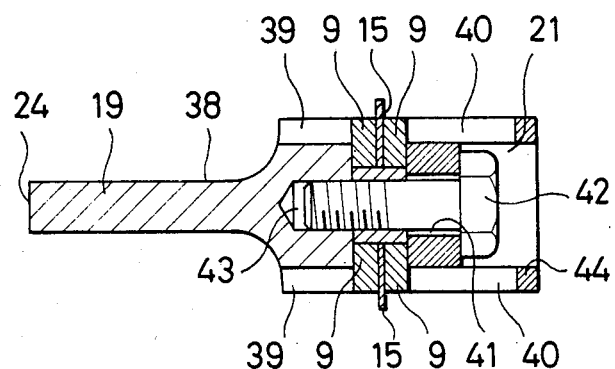
FIG. 16 is a longitudinal sectional view of FIG. 15.

FIG. 14 shows a modification of the electrostrictive element 9. Divided electrostrictive element bodies 11 are used for each electrode 13. Of course, two bodies are formed as a pair. These electrostrictive element bodies 11 together with an electrode plate 15 are held between a vibrator 19 and a metal member 21, and made one body by tightening.

A third embodiment of the invention will be described referring to FIGS. 15 through 18. The structure of an ultrasonic vibrator in this embodiment is basically the same as that in the second embodiment. Like parts to the second embodiment are designated by the same reference numerals, and the description thereof shall be omitted. In this embodiment, a groove 40 corresponding to a groove 39 also formed in the to side of a metal member 21. That is, on the circumferential surface of the metal member 21, two grooves 40 corresponding to the groove 39 of the vibrator 19 are formed in the axial direction to the end portion. These grooves 40 are formed at a position along the dividing line per each electrode 13 in similar manner to the groove 39. On the other hand, the vibrator 19 and the metal member 21 are tightened when a bolt 42 penetrating a through hole 41 of the metal member 21 is threadedly engaged with a female screw 43 of the vibrator 19.

Figure 17:
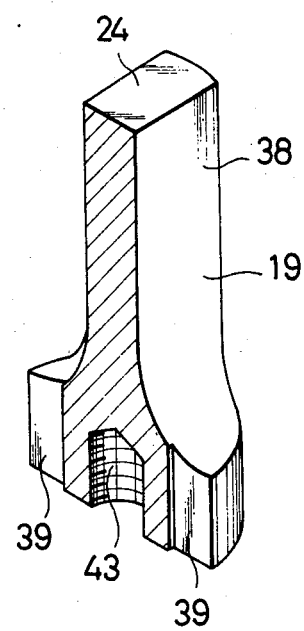
FIG. 17 is a sectional perspective view of a vibrator.
Figure 18:
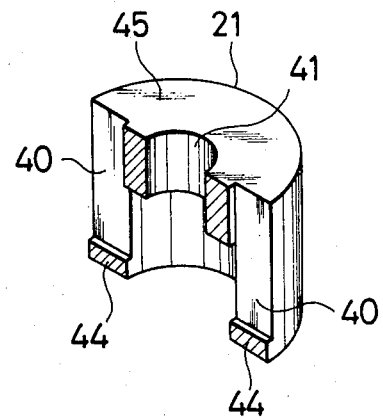
FIG. 18 is a sectional perspective view of an metal member.
Figure 19:
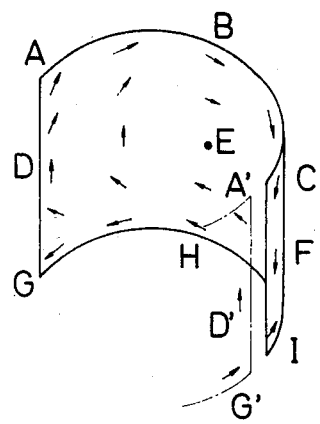
FIG. 19 is a diagram illustrating the distribution state of vibration displacement.

In this construction, the grooves 39, 40 contribute to the release of harmful stress during the bending vibration. The reason will be explained referring to FIGS. 17 through 19. FIG. 17 shows a sectional form of the vibrator 19, and FIG. 18 shows a sectional form of the metal member 21. FIG. 19 shows an observed vibration displacement distribution on the circumferential surface of the metal member 21 during the bending vibration. The surface shown in FIG. 19 is that seen from the same viewing angle as that of FIG. 18. Segment ABC represents a portion contacting the electrostrictive element 9, segment GHI the open end, and segments ADG and CFI the portions of the groove 40. As clearly seen from the figure, during the bending vibration, the whole device is vibrated about the node E in the rotational direction. Regarding the groove portion CFI, point C is displaced in a left downward direction, point F is displaced downward, and point I is displaced to the left. Regarding A', D', G' opposed with respect to the groove 40, point A' is displaced in a left upward direction, point D' is displaced upward, and point G' is displaced to the right. Consequently, the displacement directions are different except for the point I, and it is understood that the stress is released on account of existence of the groove 40. Regarding GHI, displacement in the up-and-down direction is suppressed by the connecting member 44 at the end of the groove 40 and therefore the vibration in the torsional direction is effected. The connecting member 44 performs the important roll of preventing the obstruction of uniform pressure supply to the electrostrictive element 9 due to the umbrella-like center projection produced in the contact surface 45 with the electrostrictive element 9 when the vibrator 19 is tightened. Thus harmful stress during the bending vibration is released by the groove 40 and an ultrasonic vibrator excellent in the resonance property can be obtained.

Figure 20:
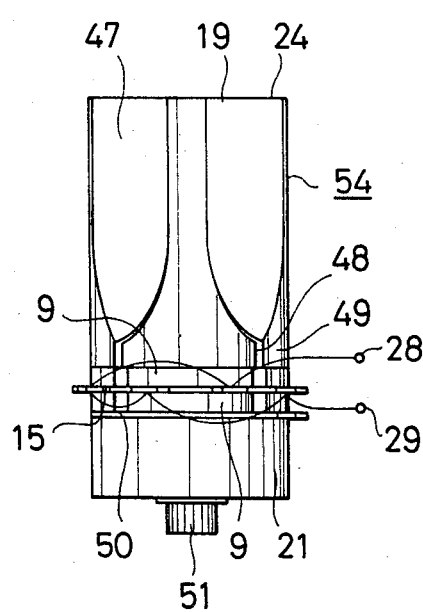
FIG. 20 is a side view illustrating a fourth embodiment of the invention.
Figure 21:
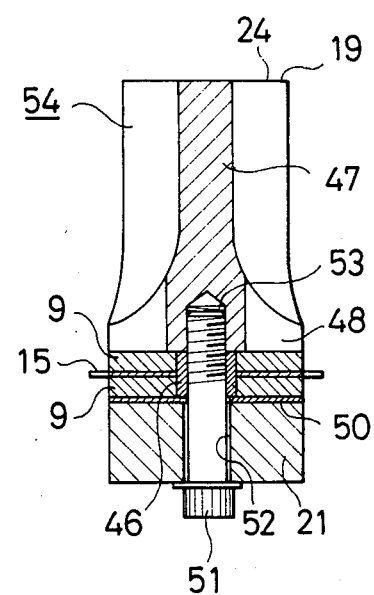
FIG. 21 is a longitudinal sectional view of FIG. 20.

A fourth embodiment of the invention will be described referring to FIGS. 20 through 22. Like parts to the first embodiment are designated by the same reference numerals, and the description thereof shall be omitted (also in later embodiments). Two electrostrictive elements 9 have respective electrodes 13 opposed with respect to an electrode plate 15, and an insulation cylinder 46 is inserted at the center. A vibrator 19 is contacted with a surface at the side of a common electrode 14 of one electrostrictive element 9. The vibrator 19 has an output end portion 24 of crosswise form comprising four contact feet 47, formed radially. At an end portion opposite the output end portion 24, slits 48 are formed in crosswise radial directions shifted by 45° from the output end portion 24. Foot portions 49 are formed by the slits 48. A metal member 21 is contacted with the surface at the side of the common electrode 14 of other electrostrictive element 9 through a common electrode plate 50, and the whole device is fixed integrally by a bolt 51 as a tightening tool. That is, a bolt hole 52 for inserting the bolt 51 is formed on the metal member 21, and a screw portion 53 to be threadedly engaged with the bolt 51 is formed on the vibrator 19. Thus a compound vibrator 54 is constituted.

Figure 22:
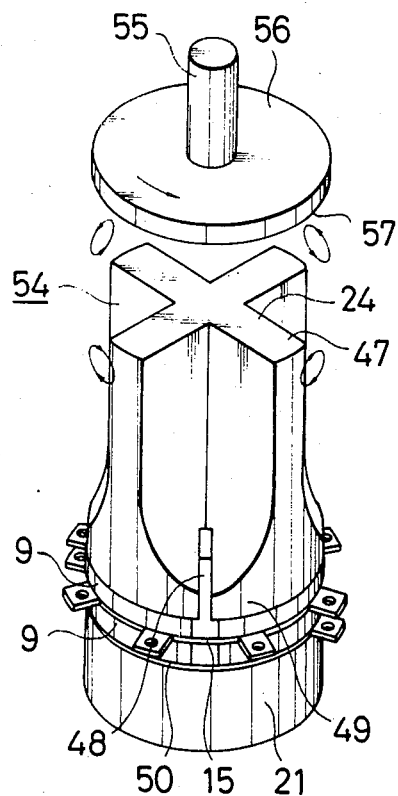
FIG. 22 is an exploded perspective view illustrating a state applied to an ultrasonic motor.

FIG. 22 shows an example of the compound vibrator 54 applied to an ultrasonic motor. The output end portion 24 of the compound vibrator 54 is pressed against a surface 57 of a disk-like rotor 56 having a support shaft 55 installed at the center.

A fifth embodiment of the invention will be described referring to FIGS. 23 through 26. An electrostrictive element 9 shown in FIG. 24 comprises 10 sector-like block elements 58 arranged annularly in the circumferential direction. Each sector-like block element 58 is provided with electrodes 13 halved in a pair by an insulation portion 12 and formed on one surface of an electrostrictive element body 11 polarized in thickness direction, and with a common electrode 14 formed on other surface thereof. A small hole 59 is formed on center portion of each sector-like block element 58.

Figure 25:
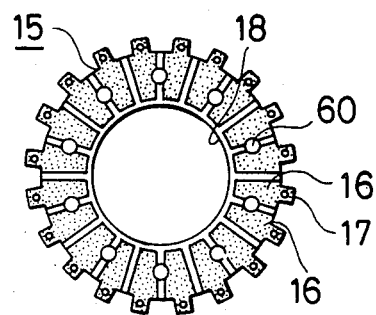
FIG. 25 is a plan view of an electrode plate.
Figure 26:
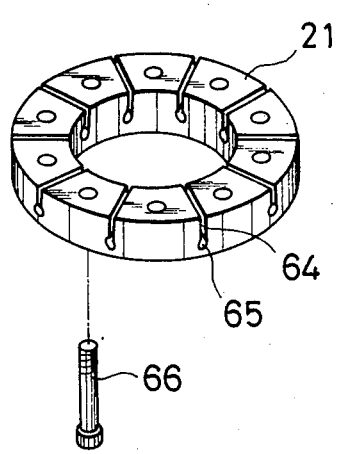
FIG. 26 is a perspective view of an metal member and a fixing screw.
Figure 27:
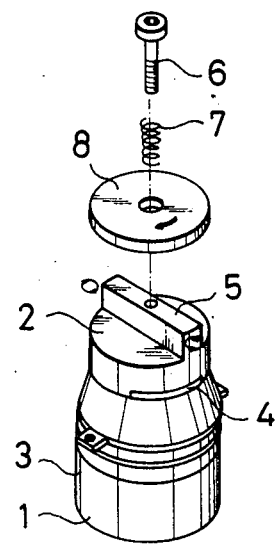
FIG. 27 is an exploded perspective view illustrating an example in the prior art.

FIG. 25 shows an electrode plate 15. The electrode plate 15 has an electrode portion 16 corresponding to each electrode 13 of the electrostrictive element 9, and also has a small hole 60 corresponding to a small hole 59 of the electrostrictive element 9. Regarding material, the electrode plate is constituted by a print circuit board of glass-epoxy thin plate with copper foils applied to both surfaces.

Figure 23:
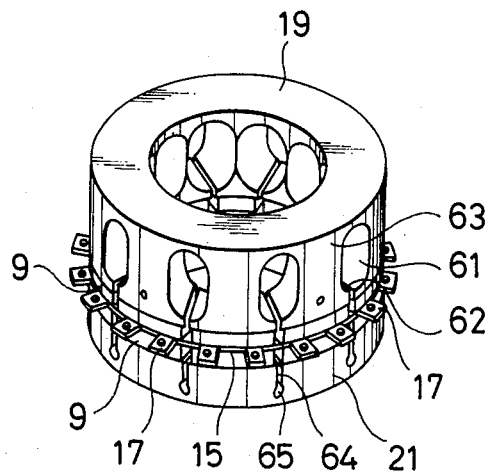
FIG. 23 is a perspective view illustrating a fifth embodiment of the invention.
Figure 24:
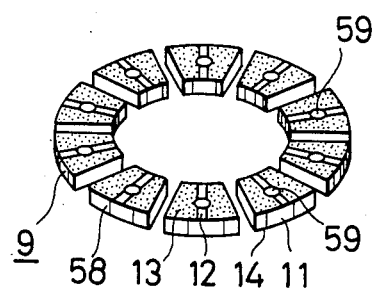
FIG. 24 is a perspective view of an electrostrictive element.

The vibrator 19 and the metal member 21 are of cylindrical form as shown in FIG. 23. More specifically, the vibrator 19 has a groove 61 and a slit 62 coincident with the divisions in the sector-like block element 58. A foot portion 63 is formed by the groove 61 and the slit 62, and a female screw (not shown) is formed at center portion of the foot portion 63. On the other hand, the metal member 21 is also provided with a slit 64 angularly matching the sector-like block element 58, but this is different from vibrator 19 in that a circular hole 65 leads to the slit 64.

Two electrostrictive elements 9 grasping the electrode plate 15 therebetween are grasped by the vibrator 19 and the metal member 21, and these are tightened by a fixing screw 66, thereby an ultrasonic vibrator is constituted.

In such constitution, if the vibrator 19 is an ordinary cylinder without the groove or the like, the diameter of vibrator 19 becomes large during the axial vibration, and uniform vibration of the output end portion 24 is obstructed by interference in the width direction due to the Poisson effect. On the contrary, in this embodiment, the interference is prevented by the groove 61 formed in the axial end portion of the vibrator 19, the slit 62, the divided electrostrictive element 9, the slit 64 of the metal member 21, and the circular hole 65. Accordingly, vibration distribution in the output end portion 24 becomes uniform.

Essential parts of each embodiment can be applied to other embodiments. For example, the groove 40 of the metal member 21 described in the third embodiment is effective also in other embodiments.

Various embodiments other than the above-mentioned embodiment and various modifications and combination of those, of course, exist within the scope of the invention described in claims.

What is claimed is:

1. An ultrasonic vibrator comprising:
   an electrostrictive element body polarized in a thickness direction thereof;
   a plurality of electrode pairs circumferentially arranged on one surface of the electrostrictive element body, each said electrode pair comprising electrodes halves spaced in a circumferential direction of said electrostricting element body and a common electrode formed on other surface thereof; and
   a vibrator member and a metal member rigidly holding at least one said electrostrictive element body therebetween;
   wherein said vibrator member is divided in the circumferential direction thereof by a dividing number coincident with the number of said electrode pairs to form foot portions.

2. The vibrator of claim 1, wherein said vibrator includes an output end and wherein there are at least three of said foot portions.

3. The vibrator of claim 1, including grooves provided on said vibrator member and said metal member at facing end portions thereof and extending along a dividing line between said electrode pairs.

4. The vibrator of claim 1, including an electrode plate and two of said electrostrictive element bodies separated by said electrode plate.

5. A drive control method for an ultrasonic vibrator having at least one electrostrictive element body polarized in a thickness direction thereof and rigidly clamped between a metal member and a vibrator member, a plurality of circumferentially halved electrode pairs on one surface of each said electrostrictive element body and a common electrode on another surface of said electrostrictive element body, said vibrator member being divided in the circumferential direction thereof by a dividing number coincident with a number of said electrode pairs to form foot portions, said method comprising the steps of:
forming two parallel circuits, each said parallel circuit comprising a series connection of circumferentially matching electrodes of said electrode pairs;
applying AC voltages to said parallel circuits; and
controlling mutual phase differences between said voltages applied to said parallel circuits.

6. The method of claim 5, including the step of inverting one of said AC voltages.

7. A drive control method for an ultrasonic vibrator having at least one electrostrictive element body polarized in a thickness direction thereof and rigidly clamped between a metal member and a vibrator member, a plurality of circumferentially halved electrode pairs on one surface of each said electrostrictive element body and a common electrode on another surface of said electrostrictive element body, said vibrator member being divided in the circumferential direction thereof by a dividing number coincident with a number of said electrode pairs to form foot portions, said method comprising the steps of:
forming two parallel circuits, each said parallel circuit comprising a series connection of circumferentially matching electrodes of said electrode pairs;
applying AC voltages to said parallel circuits; and
controlling mutual amplitude difference between said voltages applied to said parallel circuits.

8. The method of claim 7, including the step of controlling mutual phase differences between said voltages applied to said parallel circuits.

* * * * *